United States Patent [19]
Conte et al.

[11] Patent Number: 5,879,583
[45] Date of Patent: Mar. 9, 1999

[54] PROCESS FOR PRODUCING HIGH-POROSITY NON-EVAPORABLE GETTER MATERIALS AND MATERIALS THUS OBTAINED

[75] Inventors: Andrea Conte, Milan; Sergio Carella, Varese, both of Italy

[73] Assignee: SAES Getters S.p.A., Lainate, Italy

[21] Appl. No.: 924,554

[22] Filed: Aug. 27, 1997

Related U.S. Application Data

[63] Continuation of Ser. No. 477,100, Jun. 7, 1995, abandoned.

[30] Foreign Application Priority Data

Dec. 2, 1994 [IT] Italy .................................. MI94A2449
Apr. 14, 1995 [IT] Italy .................................. MI95A0779

[51] Int. Cl.$^6$ ................................. H01J 7/18; H01J 35/20
[52] U.S. Cl. ...................................... 252/181.1; 252/181.6
[58] Field of Search ............................... 252/181.1, 181.6

[56] References Cited

U.S. PATENT DOCUMENTS 4,428,856  1/1984  Boyarina et al. ..................... 252/181.1
4,671,889  6/1987  Schreiner et al. ................... 252/181.2

FOREIGN PATENT DOCUMENTS

| 2 171 076 A | 9/1973 | France . |
| 2171076 | 9/1973 | France . |
| 22 04 714 | 10/1979 | Germany . |
| 1 373 473 | 11/1974 | United Kingdom . |
| 2 077 487 | 12/1981 | United Kingdom . |

*Primary Examiner*—C. H. Kelly
*Attorney, Agent, or Firm*—Hickman & Martine, LLP

[57] ABSTRACT

A process is disclosed for producing non-evaporable getter materials having high porosity and improved gas absorption rates. The process includes mixing together a metallic getter element, a getter alloy and a solid organic compound, all three components being in the form of powders having specific particle sizes. The mixture is subjected to a compression of less than about 1000 kg/cm$^2$ and is sintered at a temperature between about 900° C. and about 1200° C. for a period between about 5 minutes and about 60 minutes. The getter material thus obtained is used to produce getter bodies shaped as pellets, sheets or discs having better mechanical strength than similar bodies of other getter material having comparable porosity.

12 Claims, 8 Drawing Sheets

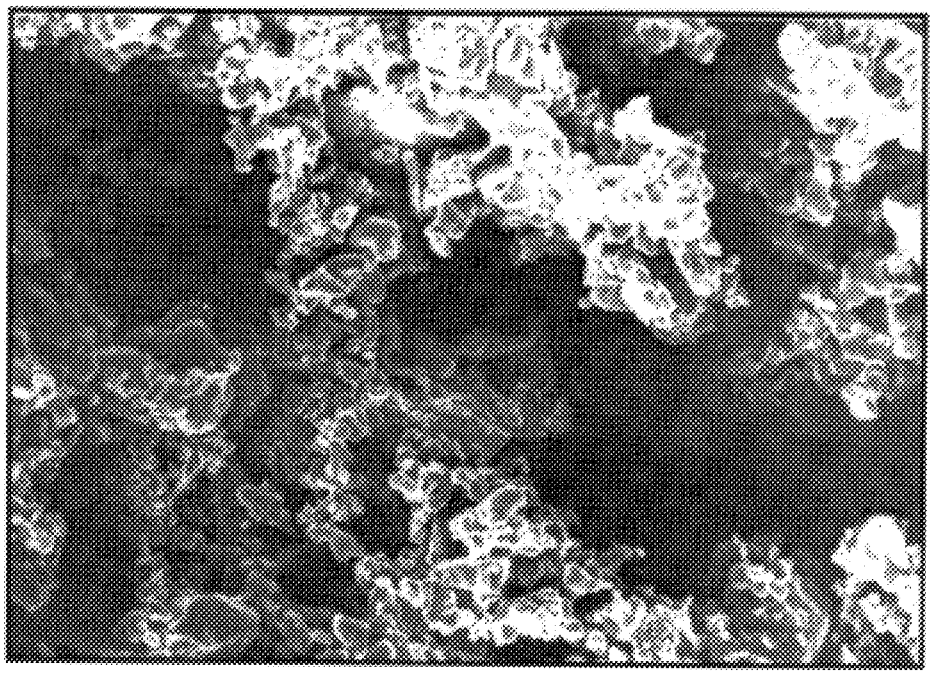
Fig. 1a
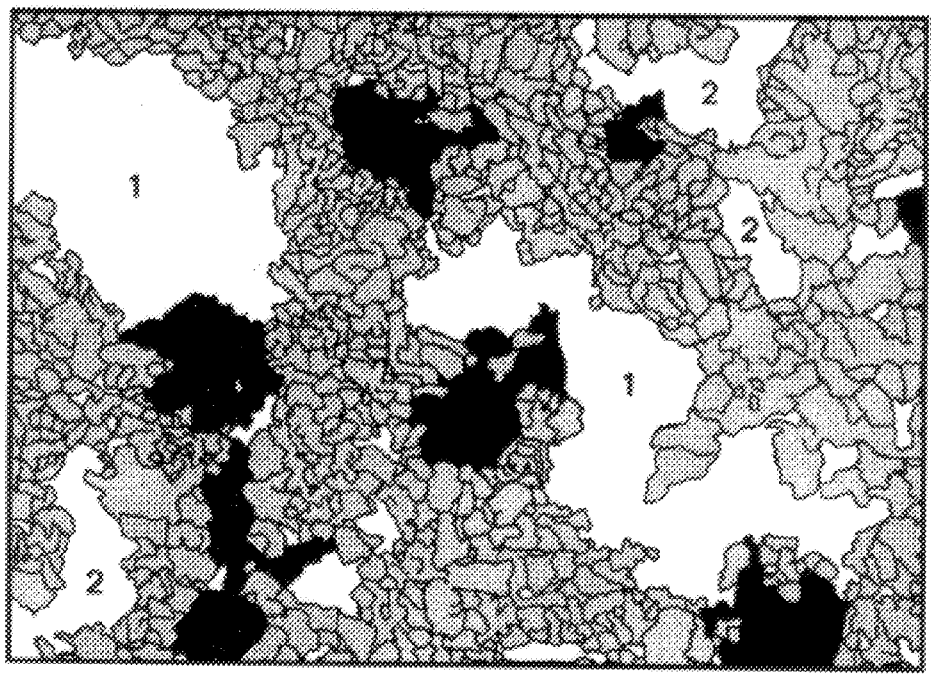
Fig. 1b ■ ST 707 ☐ Zr

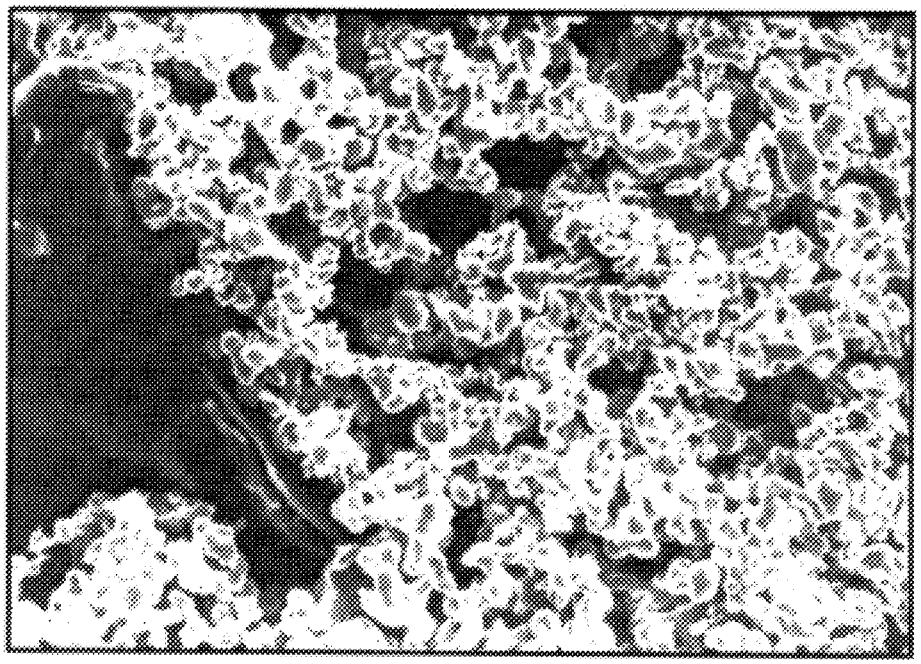
Fig. 2a
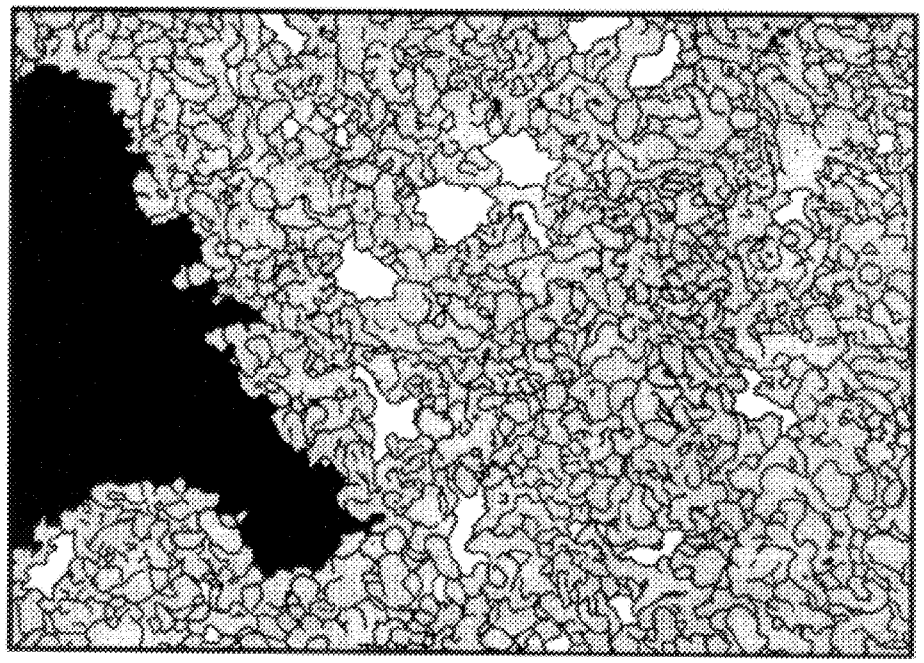
Fig. 2b  ■ Grafite  ▫ Zr

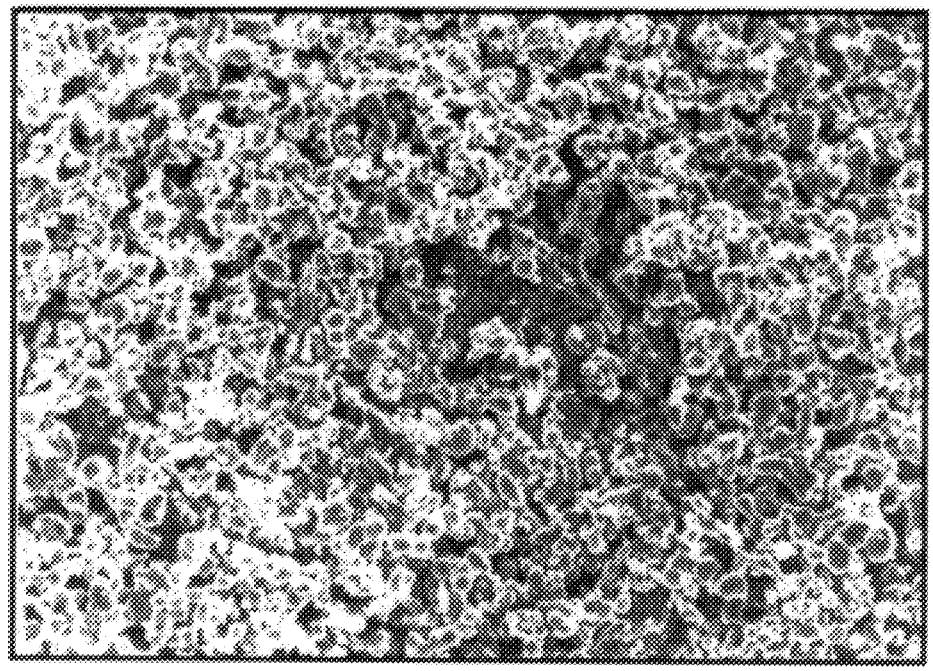
Fig. 3a
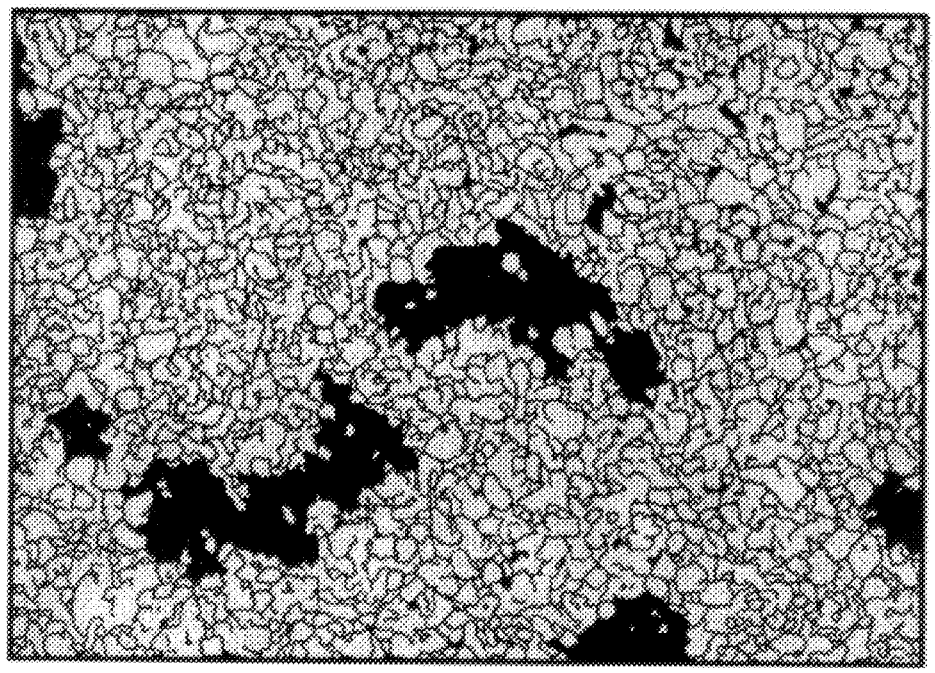
Fig. 3b  ■ St 707   □ Zr

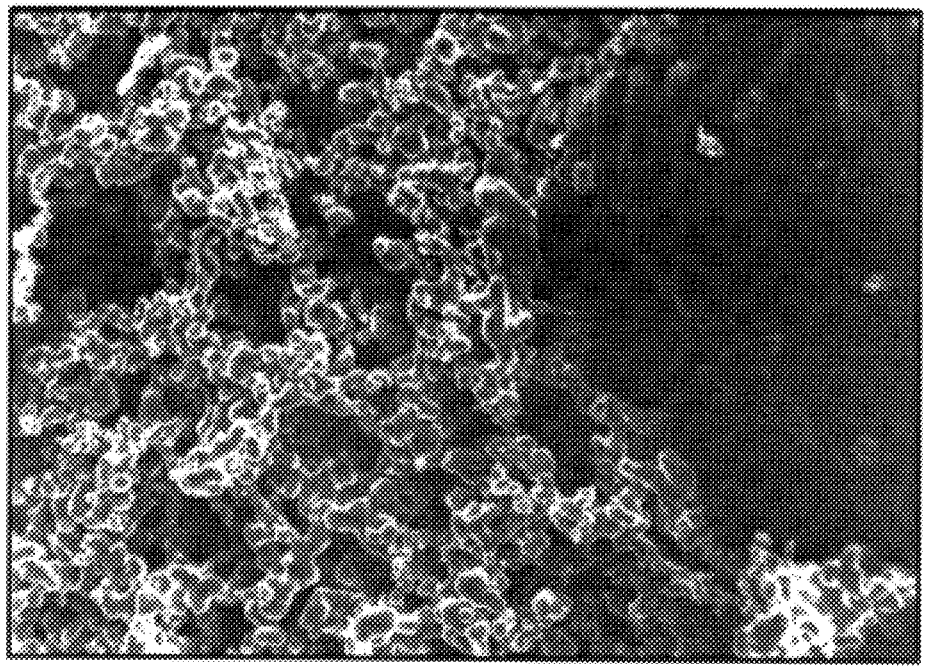
Fig. 4a
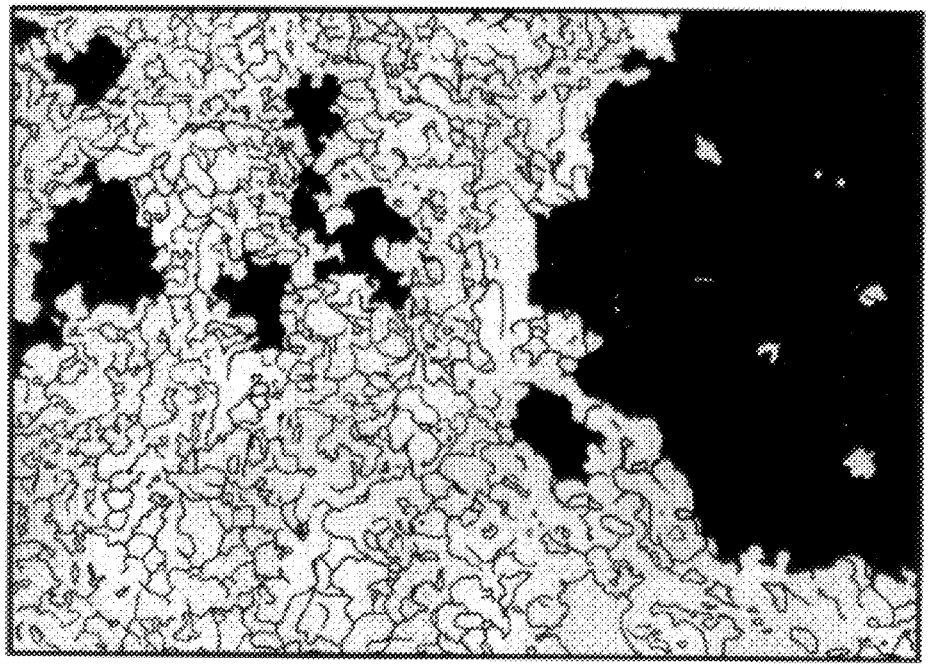
Fig. 4b  ■ Grafite  ▦ Zr

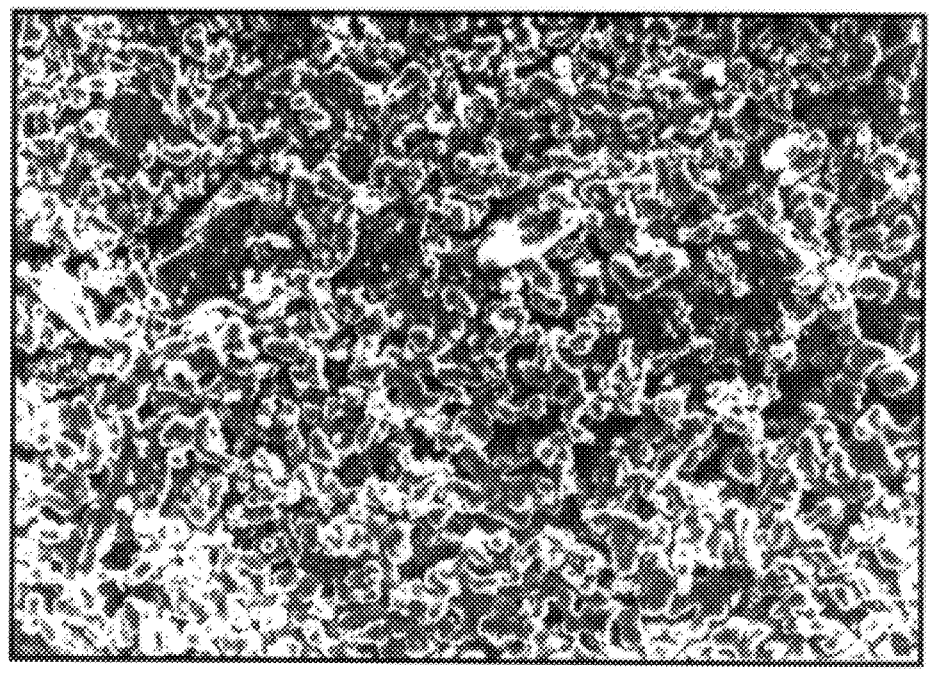
Fig. 5a
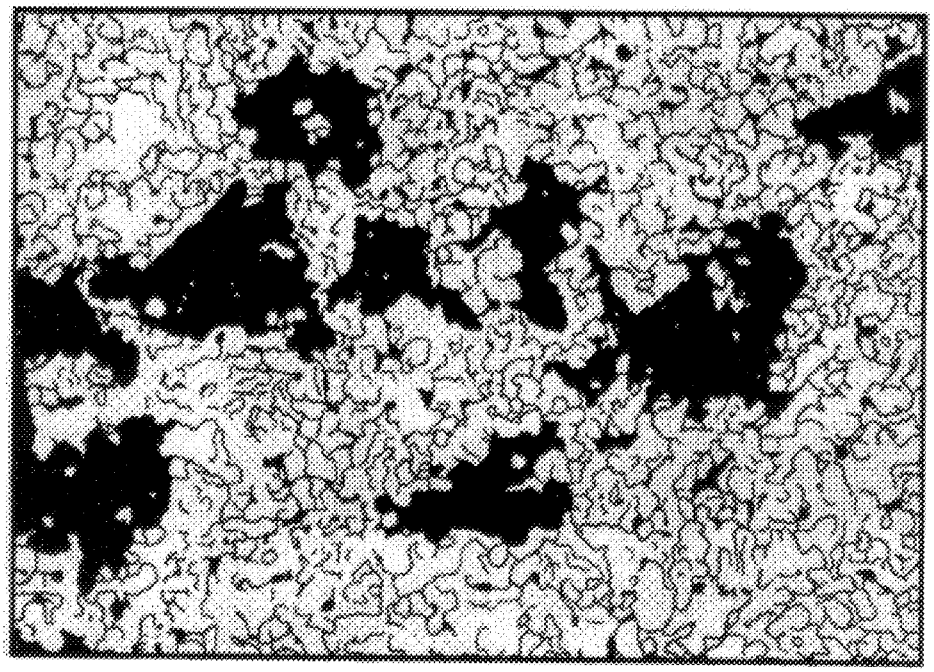
Fig. 5b  ■ St 707   ☐ Zr

PROCESS FOR PRODUCING HIGH-POROSITY NON-EVAPORABLE GETTER MATERIALS AND MATERIALS THUS OBTAINED

This is a continuation, of application Ser. No. 08/477,100 filed Jun. 7, 1995, now abandoned.

CLAIM OF FOREIGN PRIORITY PURSUANT TO 35 U.S.C. § 119

This patent application claims priority under 35 U.S.C. § 119 from Italian Patent Application Ser. No. MI 94 A 02449, filed Dec. 2, 1994, which is incorporated herein by reference and from Italian Patent Application Ser. No. MI95 A 000779, filed Apr. 14, 1995.

BACKGROUND OF THE INVENTION

The Field of the Invention

The present invention relates to field of getter materials. In particular, the present invention relates to processes for making non-evaporable getter materials having a very high porosity and to the getter materials thus obtained.

The Relevant Art

Non-evaporable getter materials (known in the art as "NEGs") are widely used for creating and maintaining high vacuum conditions. Such conditions are required commonly for devices such as thermal insulators, lamps and in semiconductor processing chambers. These materials also are used for the purification of gases for application in processes requiring gases of high purity such as semiconductor manufacturing processes. Common NEG materials include metals such as zirconium (Zr), titanium (Ti), niobium (Nb), tantalum (Ta), vanadium (V) and their alloys. The alloys can include additional elements, such as aluminum (Al) and/or iron (Fe), for example, the alloy having a weight percentage composition Zr 84%-Al 16% which is manufactured and sold by SAES® Getters S.p.A. (Milan, Italy) under the tradename St 101 or the alloy having a weight percentage composition Zr 70%-V 24.6%-Fe 5.4%, also manufactured and sold by SAES® Getters under the tradename St 707.

Getter materials act by chemisorption of gases such as carbon monoxide (CO), carbon dioxide ($CO_2$), water ($H_2O$), molecular oxygen ($O_2$), and molecular hydrogen ($H_2$). Apart from $H_2$, which dissociates and diffuses inside the getter material even at low temperatures, the other gases remain chemisorbed on the surface of the getter material over temperatures which range from about 200° C. to about 500° C., depending on the NEG material. The diffusion of the chemisorbed species into the material occurs at higher temperatures.

The surface characteristics of the NEG material play a fundamental role in the absorption of reactive gases. A large specific surface (surface per unit weight) of the material and access of the gases to the surface of the NEG material are parameters of fundamental importance to the performance of the NEG. These parameters would be optimized by the use of NEG materials in the form of powders, but powdered NEG materials cannot be used in practice. Rather, the powder NEG materials either are compressed into pellets which are sintered to impart mechanical strength, loaded and compressed in open containers, or rolled onto a support. Regardless of the form employed, the compression and/or heat sintering operations reduce the specific surface of the NEG materials with respect to the starting powder. Moreover, most of the getter particles reside within the interior bulk of the sintered getter material where the gases to be sorbed have only limited access with a consequential decrease in the absorption capacity of the device and in the gas absorption rate.

German Patent Application DE-A-2,204,714 discloses a method for preparing porous NEG devices based on metallic zirconium. According to this method, graphite powder is added to the zirconium powder, along with a third organic component, for example ammonium carbamate, whose weight may reach the total weights of the zirconium and graphite. During the heat sintering treatment the organic component evaporates, leaving a porous structure consisting of zirconium and graphite which acts as an anti-sintering agent for zirconium; thus preventing an excessive reduction in the specific surface of the zirconium.

However, the above-cited German patent application refers only to the use of elemental components and does not mention the use of alloys. Also, the organic component is added in the form of powder of millimeter-sized grains. Due to the large grain size of the organic component, the final getter device has a high porosity with respect to its geometric volume. The porosity distribution obtained, however, is does not enhance access of gases to the surface of the internal NEG material grains. Furthermore, the materials thus prepared have poor mechanical properties.

British Patent GB-2,077,487 discloses a porous NEG material obtained from a powder mixture of a metallic getter material, such as titanium or zirconium, and the previously mentioned St 707 alloy as an anti-sintering agent. According to the disclosure, the particles of metallic material have a size of about 125 $\mu$m, while the particles of the St 707 alloy have a size of less than 400 $\mu$m but are larger than the size of the metallic component. The patent specification states that the ratio of the sizes of the two components is selected so as to prevent an excessive sintering of the metal during the heat treatment, which would lead to a reduction of the specific surface and consequently to a lower efficiency of the resulting getter device. The use of an organic component is not discussed.

Finally, U.S. Pat. No. 4,428,856 discloses a porous NEG material containing from 50% to 98% titanium by weight, from 1.5% to 30% of a high melting point metal selected from among niobium, tantalum, molybdenum (Mo) and tungsten (W), and from 0.5% to 20% of titanium hydride ($TiH_2$). This patent states that zirconium powders are readily flammable and explosive, whereby one of the objects of the patent is to provide a getter composition that avoids the use of zirconium.

The porosity and specific surface characteristics of the above-described porous NEG materials, though improved with respect to the conventional NEGs, still are not sufficient for particular applications, such as small-volume getter pumps where high performance is required of the getter material. Thus, it would be advantageous to provide porous NEGs that have good mechanical strength and improved porosity and specific surface characteristics.

SUMMARY OF THE INVENTION

The present invention provides getter materials and getter bodies having the combined properties of good mechanical strength, high porosity and high specific surface characteristics. Thus, the present invention provides getter materials and getter bodies that can be employed in applications requiring high-performance gettering, such as the maintenance of vacuum states using small volume getter pumps.

In one aspect, the present invention provides a method for making a non-evaporable getter material. The method of the invention includes providing a powder mixture that includes a metallic getter element having a grain size smaller than about 70 μm; and a getter alloy having a grain size smaller than about 40 μm. Also included in the mixture is an organic component which is a solid at room temperature and has the characteristic of evaporating at 300° C. substantially without leaving a residue on the grains of either the metallic getter element or the getter alloy when the materials forming the mixture are sintered. In addition, the organic powder has a particle size distribution such that about half of its total weight consists of grains smaller than about 50 μm, the remainder of the grains being between about 50 μm and about 150 μm in size. The powder mixture is then subjected to compression at a pressure less than about 1000 kg/cm² to form a compressed powder mixture. The compressed powder mixture is sintered at a temperature between about 900° C. and about 1200° C. for a period of between about 5 minutes and about 60 minutes. During the sintering, the organic component evaporates from the compressed powder mixture substantially without leaving a residue on the grains of the metallic getter element and the getter alloy to form thereby a network of large and small pores in the getter material.

In one embodiment, the weight ratio between the metallic getter element and the getter alloy is between about 1:10 and about 10:1. In another embodiment, the weight of the organic compound consists of up to about 40% of the overall weight of the powder mixture. In still another embodiment, the getter alloy is a Zr-V-Fe tertiary alloy having a weight percentage composition of Zr 70%-V 24.6%-Fe 5.4% and the metallic getter element is zirconium.

In another aspect the present invention includes getter bodies formed from the getter material resulting from the process of the invention. In one embodiment, the getter body is formed into a pellet, a sheet or a disc.

These and other aspects and advantages of the present invention will become more apparent when the Description below is read in conjunction with the accompanying Drawings.

BRIEF DESCRIPTION OF THE DRAWINGS

FIG. 1a shows a microphotograph obtained with a scanning electron microscope (SEM), magnification ×700, of a getter material of the invention whose preparation is described in Example 1. FIG. 1b shows a drawing reproducing the microphotograph of FIG. 1a. The black areas of FIG. 1b correspond to regions of St 707 alloy, the gray areas to regions of Zr and the white areas to pores of large size (denoted "1") and pores of smaller size (denoted "2").

FIG. 2a shows a SEM microphotograph, magnification ×700, of a getter material whose preparation, describe Example 2, following the procedures described in DE-A-2,204,714 cited above. FIG. 2b shows a drawing reproducing the microphotograph of FIG. 2a. In FIG. 2b, the black areas correspond to regions of graphite and the gray areas to regions of Zr.

FIG. 3a shows a SEM microphotograph, magnification ×700, of a getter material prepared as described in Example 3 according to the procedures described in GB-2,077,487 cited above. FIG. 3b shots a drawing reproducing the microphotograph of FIG. 3a. The black areas of FIG. 3b correspond to regions of St 707 alloy, the gray areas to regions of Zr.

FIG. 4a shows a SEM microphotograph, magnification ×700, of a comparative getter material obtained according to the process described in Example 4. FIG. 4b shows a drawing reproducing the microphotograph of FIG. 4a. In FIG. 4b, the black areas correspond to regions of graphite and the gray areas to regions of Zr.

FIG. 5a shows a SEM microphotograph, magnification ×700, of a comparative getter material obtained according to the process described in Example 5. FIG. 5b shows a drawing reproducing the microphotograph of FIG. 5a. The black areas of FIG. 5b correspond to regions of St 707 alloy, the gray areas to regions of Zr.

is given as a function of the amount of absorbed CO (Q) measured in cubic centimeter·torricelli per gram of getter material (cc·torr/g).

Figure 6:
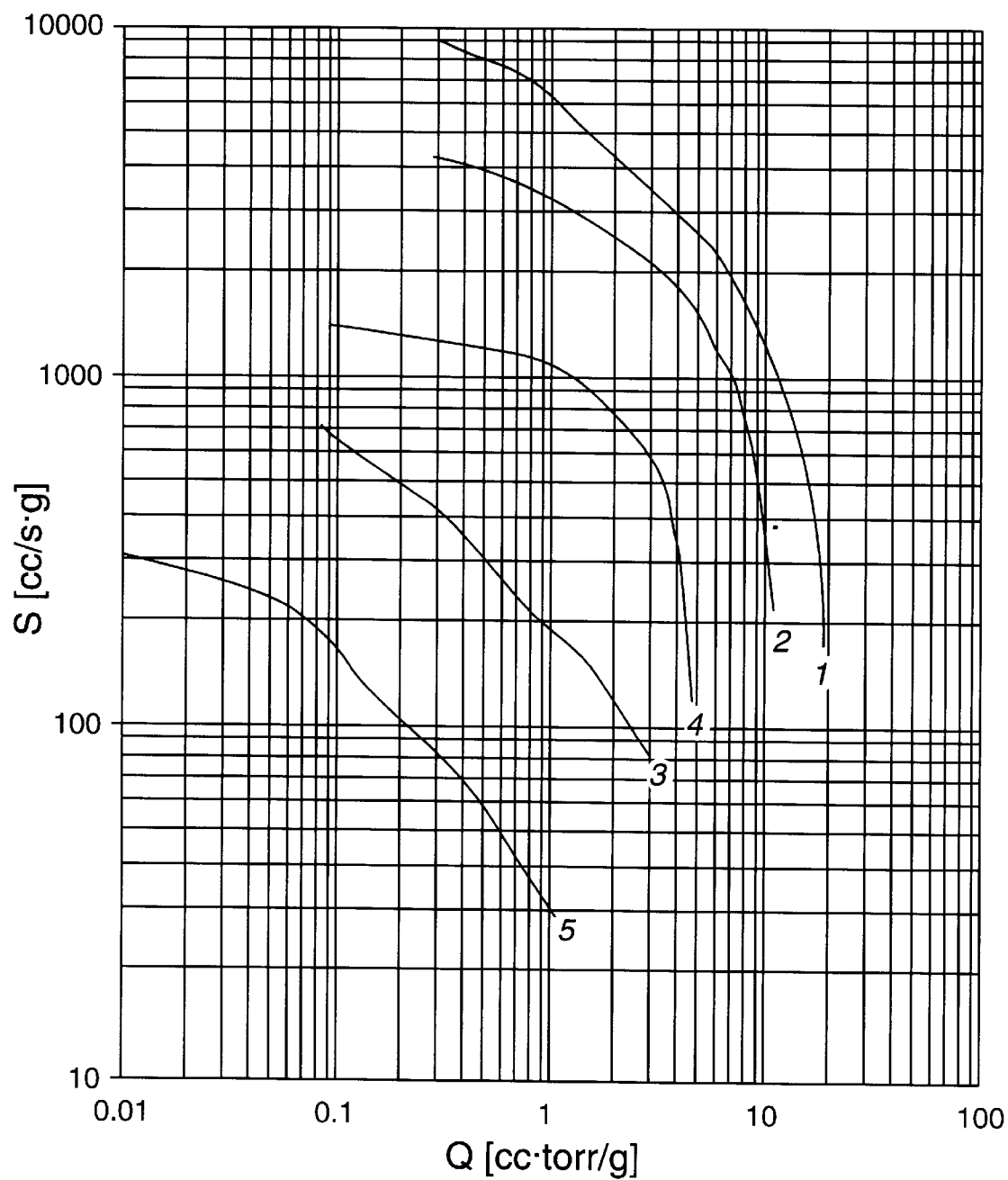
FIG. 6 shows a graph of the gas absorption characteristics of the five samples of getter material of FIGS. 1–5. The CO absorption rate (S), measured in cubic centimeters of absorbed CO per second per gram of getter material $$\left(\frac{cc}{s \cdot g}\right),$$
Figure 7:
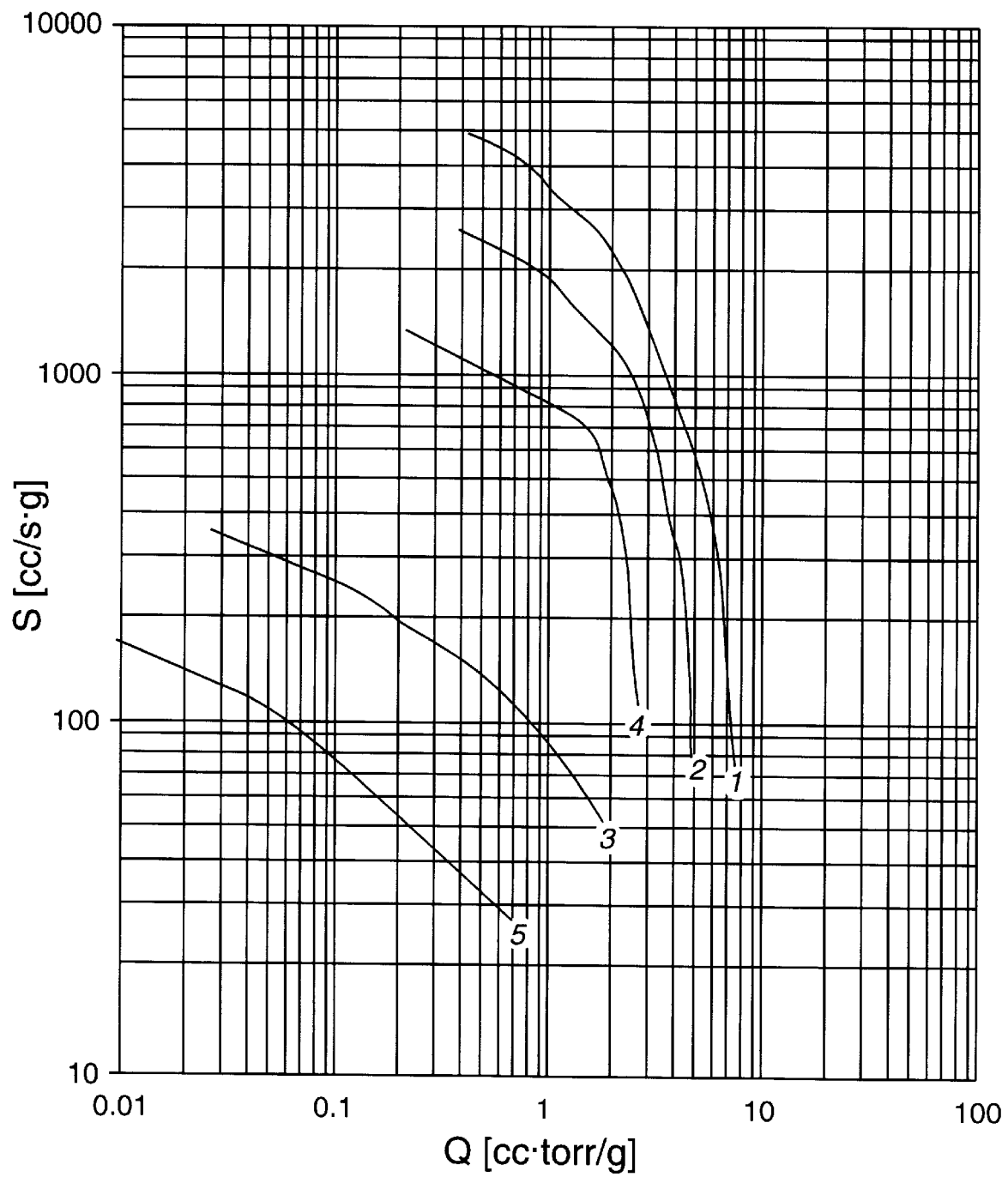

FIG. 7 shows the nitrogen absorption curves for the same samples of FIG. 6.

FIG. 8a, 8b, 8c and 8d illustrate some possible shapes of getter bodies which can be obtained usign the getter material of the present invention.

DESCRIPTION OF SPECIFIC EMBODIMENTS

In one aspect, the present invention provides getter materials having novel structural and functional characteristics that provide excellent gettering performance. In particular, the getter materials of the present invention include a unique network of pores that imparts to the getter materials of the invention high porosity and surface area in addition to good mechanical strength.

As seen in FIGS. 1a and 1b, the getter materials of the invention comprise a porous internal structure including a first network of large diameter pores 1 providing gas molecules access to the internal portions of the getter material. The first network of pores is combined with a second network of smaller diameter pores 2 that provide access to the surfaces of the single grains of the components which comprise the getter material. From the combination of these two pore networks high values of porosity and surface area, together with good mechanical strength, are imparted to the getter materials of the invention as will be described in greater detail below. This unique structure is obtained by sintering a metallic getter element, a getter alloy and an organic solid as described herein.

In one embodiment, the components of the getter materials of the invention comprise a metallic getter element in combination with a getter alloy. The metallic getter element may be any of the elemental metals employed in the field, such as, but not limited to, zirconium (Zr), titanium (Ti), niobium (Nb), vanadium (V) and tantalum (Ta). Among these titanium and zirconium are preferred. The metallic getter element can be employed in the form of a fine powder having a particle size smaller than about 70 μm. In one embodiment, the particle size is between about 40 μm and about 60 μm.

The getter alloy can be a titanium-based getter alloy that optionally can be combined with one or more transition elements. Alternatively, a zirconium-based alloy, such as, for example, the binary alloys Zr-Al, Zr-V, Zr-Fe and Zr-Ni, or ternary alloys, e.g., Zr-Mn-Fe or Zr-V-Fe can be used. The Zr-V-Fe alloys are described in U.S. Pat. No. 4,312,669 to Boffito, et al., which is incorporated herein by reference. The use of the Zr-V-Fe tertiary alloys is preferred, and in particular the above-mentioned St 707 alloy, having a weight-based percentage composition Zr 70%-V 24.6%-Fe 5.4%. The latter alloy is available commercially from SAES® Getters S.p.A. (Milan, Italy). According to one embodiment of the present invention, the getter alloy is employed in the form of a powder having a maximum particle size smaller than about 40 $\mu$m. In another embodiment the particle size is smaller than about 30 $\mu$m.

The weight ratio between the metallic getter element and the getter alloy can vary over a wide range. In one embodiment, the ratios of the metallic getter element and getter alloy are between about 1:10 and about 10:1. In another embodiment this ratio is between about 3:1 and about 1:3. Amounts of the metallic element higher than those indicated above may result in decreased gettering efficiency, whereas the use of excessive amounts of the getter alloys may cause difficulties in sintering the getter bodies obtained from the powder compression, possibly leading to poor mechanical strength.

In one embodiment, the organic compound used in the formation of the getter materials of the invention is a solid at room temperature that is capable of evaporating without leaving significant residues on the grains of either the metallic getter element or the getter alloy when the components are sintered to form the getter material of the invention. In one embodiment, the organic compound is capable of evaporating as described above at temperatures lower than about 300° C., so as not to generate vapors which may react at the temperatures at which the getter materials become active. Some examples of organic materials meeting having these characteristics include, but are not limited to, ammonium oxalate, ammonium benzoate and ammonium carbamate. These materials are available commercially, e.g., from Aldrich Chemical Co. (Milwaukee, Wis.).

According to one embodiment of the invention, the organic compound is employed in the form of powder. In another embodiment, this powder includes equal portions of particles having a particle size smaller than about 50 $\mu$m and particles having a size between about 50 $\mu$m and about 150 $\mu$m. The weight of the organic compound can be as much as 40% of the combined weights of the metallic getter element and getter alloy powders described above. In one embodiment, the weight of the organic compound is between about 10% and about 35% of the combined weights of the metallic getter element and the getter alloy prior to sintering. If too little the organic compound is employed, the getter device obtained upon sintering may lack significant porosity, whereas if the amounts of organic compound used are greater than about 40% by weight, the getter bodies obtained may lack mechanical stability.

Prior to sintering, the powder mixture is subjected to a light compression at a pressure less than about 1000 kg/cm$^2$. In one embodiment, the compression is at a pressure between about 50 kg/cm$^2$ and about 800 kg/cm$^2$. Using less pressure may produce a final sintered body having a poor mechanical strength, whereas employment of a greater pressure may cause excessive powder compaction reducing the specific surface and, more importantly, reducing the porosity of the getter body. After compression, the powder mixture undergoes a heat treatment in an inert atmosphere or, more preferably, under vacuum, at a temperature between about 900° C. and about 1200° C. In one embodiment the temperature is maintained between about 1000° C. and about 1100° C. for a time between about 5 minutes and 60 minutes.

Figure 8A:
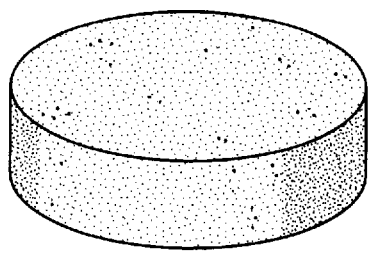

The getter materials obtained according to the process of the present invention can be employed in any application requiring the presence of a getter material, for example, in lamps, thermally insulating interspaces (e.g. in thermos bottles) or semiconductor processing chambers to maintain a vacuum, or in the purification of gases (e.g., in semiconductor manufacturing processes). The getter materials of the present invention can be formed into a variety of shapes and configurations to form getter bodies as will apparent to those having skill in the art. A possible shape of a getter body suitable for the use in thermos bottles is, for example, a pellet, as shown in FIG. 8a.

Figure 8B:
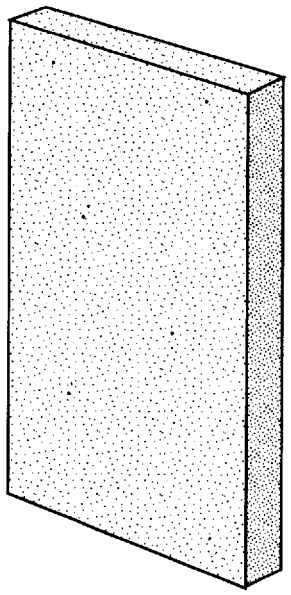
Figure 8C:
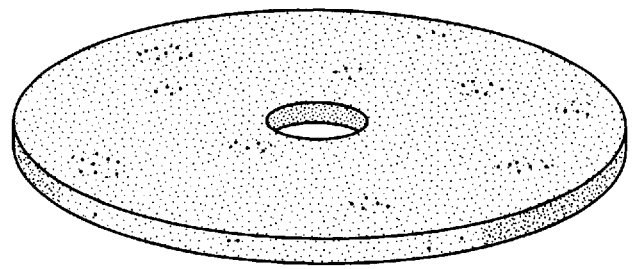
Figure 8D:
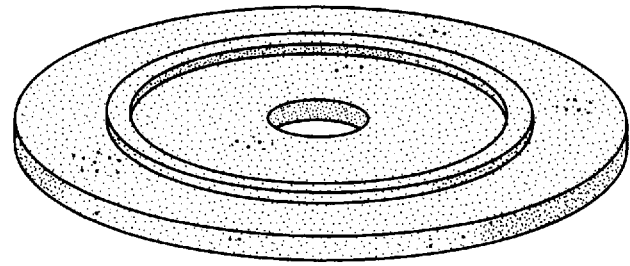

The functional characteristics of the getter materials of the invention have particular advantages to applications requiring high gas absorption performance with small-volume devices, for example, in small getter pumps. These types of getter pumps are disclosed, for example, in U.S. Pat. Nos. 5,324,172 and 5,320,496, which are incorporated herein by reference. The first of those two patents discloses a getter pump made with sheet-shaped getter bodies radially arranged around the pump axis. A possible sheet of getter material to be used in this pump is shown in FIG. 8b. The second patent discloses a pump in which the getter bodies are shaped as stacked discs arranged coaxially to the pump body. Possible alternative shapes of discs to be used in a pump similar to that of U.S. Pat. No. 5,320,496, in addition to those described in said patent, are shown in FIGS. 8c and 8d.

EXAMPLES

The following examples describe specific aspects of the invention to illustrate the invention and aid those of skill in the art in understanding and practicing the invention. However, these examples should not be construed as limiting the invention in any manner.

Example 1

This example relates to the preparation of a getter material of the invention.

A mixture was prepared comprising about 2.4 g of metallic zirconium having a particle size between about 40 $\mu$m and about 50 $\mu$m, about 3.6 g of St 707 alloy having a particle size smaller than about 30 $\mu$m and about 4.0 g of ammonium carbamate in two equal portions of about 2 g each, one portion having a particle size smaller than about 50 $\mu$m and the other portion of between about 50 $\mu$m and about 150 $\mu$m, using standard methods. The mixture was homogenized in a V-shaped mixer for about 4 hours and compressed under about 150 kg/cm$^2$ of pressure. The compacted mixture was then sintered in a vacuum furnace by heating over a period of about 2 hours to about 1,050° C. and maintaining the material at that temperature for about 30 minutes. The getter material thus prepared is referred to herein as Sample 1.

Example 2 (Comparative)

This example describes the preparation of a getter material according to the process described in German Patent Application DE-A-2,204,714.

A mixture of about 5.8 g of metallic zirconium having a particle size smaller than about 44 $\mu$m, about 1.2 g of graphite powder having a particle size between about 75 $\mu$m and about 128 $\mu$m, and about 3 g of ammonium carbamate powder having a grain size of about 1 mm was prepared using standard methods. The mixture was homogenized as in Example 1 and sintered by heating to 1,050° C. over a period of about 55 minutes and maintaining it at that temperature for about 5 minutes. The sintered getter body so prepared is referred to herein as Sample 2.

Example 3 (Comparative)

This example describes the preparation of a porous getter material according to British Patent GB-2,077,487.

A mixture of about 4 g of metallic zirconium powder having a particle size smaller than about 44 $\mu$m and about 6 g of St 707 alloy having a particle size between about 53 $\mu$m and about 128 $\mu$m was prepared using standard methods. The mixture was homogenized as in the preceding examples and sintered by following the same heat treatment as in Example 2. The getter body thus obtained is referred to herein as Sample 3.

Example 4 (Comparative)

The preparation of a getter material according to the procedure of Example 2 was repeated but using a finer grain ammonium carbamate powder, with a grain size smaller than about 44 $\mu$m. The getter body thus obtained is referred to herein as Sample 4.

Example 5 (Comparative)

The preparation of a getter material according to the procedure of Example 3 was repeated but wherein the powder mixture was compressed at a pressure of about 70 kg/cm$^2$ prior to sintering. The getter body thus obtained is referred to as Sample 5.

Example 6

Measurement of the gas absorption rate and capacity was carried out on Samples 1–5 at room temperature, after activation of the Samples by heating the Samples to about 600° C. for about 10 minutes using standard methods. The gas absorption rate measurements were made by monitoring the time required for each sample to absorb the measured amounts of gas during a series of releases of gas into the test chamber, according to the method described in ASTM F 798–82. The test gas employed was CO. The results of the tests are shown in the graph of FIG. 6 with curves labelled 1–5 corresponding to each of Samples 1–5, respectively.

Example 7

A measurement of the absorption characteristics of Samples 1–5 was carried out under the same conditions as in Example 6 using nitrogen as the test gas. The results are shown in FIG. 7.

Example 8

A measurement of the surface area for each of Samples 1–5 was performed according to the well-known B.E.T. method using a commercially available Quantasorb QS-12 instrument. The results of this test are summarized in Table 1 below.

Example 9

The apparent density and the porosity P for each of Samples 1–5 was determined. The apparent density is calculated as the ratio between the weight of a sample and its geometric volume. The term porosity indicates the percent value of porosity as calculated using the following formula:

$$P = (1 - d_{app}/d_t) \times 100$$

where $d_{app}$ is the above-defined apparent density of the sample and $d_t$ is the sample's theoretical density. The value of $d_t$ is calculated from the known absolute densities and weight fractions of the materials making up the sample using the following formula:

$$d_t = \frac{(d_A \times d_B)}{(d_A X_B \times d_B X_A)}$$

where:
 $d_A$ is the density of the first material making up the sample;
 $d_B$ is the density of the second material making up the sample;
 $X_A$ is the weight fraction of the first material making up the sample; and
 $X_B$ is the weight fraction of the second material making up the sample.

The results are shown in Table 1 below.

TABLE 1

| Sample | Surface Area (m$^2$/g) | Apparent Density (g/cm$^3$) | Porosity (%) |
|---|---|---|---|
| 1 | 0.17 | 1.85 | 71.1 |
| 2 | 0.19 | 1.43 | 70.8 |
| 3 | 0.08 | 5.07 | 20.8 |
| 4 | 0.17 | 1.4 | 70.2 |
| 5† | N/A | 6.10 | 4.7 |

†The surface area of Sample 5 was below the sensitivity threshold of the instrument and is assumed to be lower than the value of 0.08 m$^2$/g determined for Sample 3.

The process for preparing comparative Sample 4 is a variation of the process of Example 2 wherein use is made of ammonium carbamate having a particle size smaller than that of Example 2 and comparable to the particle size of the ammonium carbamate used in the process of the invention. Similarly, the process for preparing the comparative Sample 5 is a variation of the process of Example 3, wherein the powder mixture is lightly compressed as in the process of the invention.

As may be noted by examining the microphotographs shown in FIGS. 1–5, Sample 1, corresponding to a getter material of this invention, has a very different pore structure from that of both prior art comparative Samples 2–5. Specifically, the getter device of the invention has a pore structure which consists of macroporosities 1 permeating the sample body and microporosities 2 between the zirconium and alloy grains whereas Samples 2–5 all appear to have much less developed pore networks.

Table 1 above shows that the comparative Samples 2 and 4 have specific surface and porosity values comparable to those of Sample 1, whereas Samples 3 and 5 have specific surface and porosity much lower than Sample 1. On the other hand, Samples 2 and 4 have poor mechanical strength, are friable and lose particles easily, making these materials unusable in certain technological applications.

In addition to this improved combination of structural and mechanical characteristics, Sample 1 of the invention has the best gas absorption characteristics of all of the samples tested, as may be noted by examining the graphs of FIGS. 6 and 7 wherein the absorption curves at room temperature of Samples 1–5 are given, respectively, for CO and $N_2$. Sample 1 exhibits much higher absorption for both gases than either Sample 3 or 5 which have less porous structures. Sample 1 also exhibits better absorption capacity for both gases than either Samples 2 or 4, both of whose porosity characteristics more similar to those of Sample 1. A comparison of the getter bodies of the invention with the various comparative materials shows that the getter bodies of the invention combine the best mechanical and structural characteristics of the comparative materials while offering the best absorption properties.

Finally, a comparison between the absorption characteristics of Samples 2 and 4 and of Samples 3 and 5 shows that only getter materials produced using the process of the invention can achieve the excellent results described above. In fact, an examination of these Figures reveals that by changing the preparation of Sample 2 (the process according to German Patent Application No.

DE-A-2,204,714) in accordance with the process of the invention, i.e. by using ammonium carbamate having finer particle size (Sample 4), the gas absorption characteristics worsen. Similarly, a change in the process for preparing Sample 3 (the process of according to British Patent No. GB-2,077,487) by applying a light compression to the powder mixture in accordance with the process of the invention (Sample 5), also leads to a worsening of the gas absorption characteristics.

In conclusion, the tests show that the Sample prepared according to the method of the invention exhibits the best gas absorption characteristics together with good mechanical strength, making it suitable for technological applications. As can be seen from the discussion of the preparation parameters discussed above, this combination of characteristics depends on the particular process, characterized by the combination of its parameters, and does not derive merely from simple parameter changes of known processes.

Although certain embodiments and examples have been used to describe the present invention, it will be apparent to those having skill in the art that various changes can be made to those embodiment and/or examples without departing from the scope or spirit of the present invention. For example, it will be appreciated from the foregoing that many other getter alloys can be combined with the materials described herein to produce getter materials having desirable performance. Also many other metallic getter elements can be employed with the present invention, as can other organic materials having the properties described above. In addition, those of skill in the art will appreciate that the getter materials and getter bodies of the invention can be used in all applications requiring a getter material. In particular, the getter materials and getter bodies of the invention can be employed with electron tubes (e.g., fluorescent lamps), thermally insulating jackets (e.g., refrigerator panels) and semiconductor processing chambers. In addition, the getter bodies of the invention can be formed into a variety of configurations for use in getter pumps.

What is claimed:

1. A process for preparing a non-evaporable getter material having improved characteristics of porosity, gas absorption rate and capacity, comprising the steps of:
   a) providing a powder mixture including:
      i) a metallic getter element having a grain size smaller than about 70 µm;
      ii) a getter alloy having a grain size smaller than about 40 µm; and
      iii) an organic component which is solid at room temperature and has the characteristic of evaporating at 300° C. substantially without leaving a residue on the grains of said metallic getter element and said getter alloy when said metallic getter element, said getter alloy and said organic component are sintered to form said getter body; and wherein said organic component has a particle size distribution such that about half of its total weight consists of grains of size smaller than about 50 µm the remainder of said grains of said organic component having a size between about 50 µm and about 150 µm;
   b) subjecting said powder mixture to compression at a pressure less than about 1000 kg/cm$^2$ to form a compressed powder mixture; and
   c) sintering said compressed powder mixture at a temperature between about 900° C. and about 1200° C. for a period of between about 5 minutes and about 60 minutes wherein said organic component evaporates from said powder mixture substantially without leaving a residue on said grains of said metallic getter element and said getter alloy to form thereby a network of large and small pores in said getter body.

2. A process according to claim 1, wherein the weight ratio between the metallic getter element and the getter alloy is between about 1:10 and about 10:1.

3. A process according to claim 2, wherein the weight ratio between the metallic getter element and the getter alloy is between about 1:3 and about 3:1.

4. A process according to claim 1, wherein the weight of the organic compound consists of up to about 40% of the overall weight of said powder mixture.

5. A process according to claim 4, wherein the weight of the organic compound is between about 10% and about 35% of the overall weight of said powder mixture.

6. A process according to claim 1, wherein the getter alloy is a Zr-V-Fe tertiary alloy having a weight percentage composition of Zr 70%-V 24.6%-Fe 5.4%.

7. A process according to claim 1, wherein the metallic getter element is zirconium.

8. A process according to claim 1, wherein the organic component is ammonium carbamate.

9. A process according to claim 1, wherein the powder mixture is compressed with a pressure between about 50 kg/m$^2$ and about 800 kg/cm$^2$.

10. A high-porosity getter material obtained according to the process of claim 1.

11. A high-porosity getter body obtained according to the process of claim 1.

12. The high-porosity getter body of claim 11 formed into a pellet, sheet or disc.

* * * * *